United States Patent
Keshavaraj

(12) 
(10) Patent No.: US 7,354,063 B2
(45) Date of Patent: Apr. 8, 2008

(54) AIRBAG STRUCTURE

(75) Inventor: Ramesh Keshavaraj, Peachtree City, GA (US)

(73) Assignee: Milliken & Company, Spartanburg, SC (US)

( * ) Notice: Subject to any disclaimer, the term of this patent is extended or adjusted under 35 U.S.C. 154(b) by 215 days.

(21) Appl. No.: 10/796,726

(22) Filed: Mar. 9, 2004

(65) Prior Publication Data

US 2005/0200108 A1   Sep. 15, 2005

(51) Int. Cl.
 *B60R 21/16*   (2006.01)
(52) U.S. Cl. ................... 280/743.1; 280/728.1
(58) Field of Classification Search ............. 280/743.1, 280/728.1
See application file for complete search history.

(56) References Cited

U.S. PATENT DOCUMENTS

| | | | | |
|---|---|---|---|---|
| 4,944,529 | A | | 7/1990 | Backhaus .................... 280/743 |
| 5,011,183 | A | | 4/1991 | Thornton et al. ........... 280/743 |
| 5,094,476 | A | * | 3/1992 | Chihaya .................. 280/743.1 |
| 5,098,125 | A | | 3/1992 | Thornton et al. .......... 280/743 |
| 5,213,363 | A | * | 5/1993 | Fukumori et al. ....... 280/743.1 |
| 5,275,434 | A | | 1/1994 | Hirabayashi et al. ....... 280/743 |
| 5,456,493 | A | * | 10/1995 | Bauer et al. ............. 280/743.1 |
| 5,482,317 | A | | 1/1996 | Nelsen et al. ............ 280/743.1 |
| 5,482,318 | A | * | 1/1996 | Sollars, Jr. ............... 280/743.1 |
| 5,533,755 | A | | 7/1996 | Nelsen et al. ............ 280/743.1 |
| 5,607,182 | A | | 3/1997 | Nelsen et al. ............ 280/743.1 |
| 5,687,986 | A | | 11/1997 | Nelsen et al. ............ 280/728.2 |
| 5,855,393 | A | | 1/1999 | Keshavaraj ............... 280/743.1 |
| 6,439,606 | B2 | * | 8/2002 | Okada et al. ............. 280/743.1 |
| 6,494,484 | B2 | * | 12/2002 | Bosgieter et al. ......... 280/743.1 |
| 6,536,800 | B2 | * | 3/2003 | Kumagai et al. ......... 280/743.1 |
| 6,666,475 | B2 | | 12/2003 | Kippschull ............... 280/730.2 |
| 6,666,477 | B1 | | 12/2003 | Robertson et al. ....... 280/743.1 |

FOREIGN PATENT DOCUMENTS

| | | |
|---|---|---|
| EP | 0 786 382 | 7/1997 |
| GB | 2 241 207 A * | 8/1991 |
| GB | 2 390 574 | 1/2004 |

* cited by examiner

*Primary Examiner*—Ruth Ilan
(74) *Attorney, Agent, or Firm*—Terry T. Moyer; John E. Vick, Jr.

(57) ABSTRACT

An airbag construction for a vehicle is described. The construction utilizes non-circular polygon shaped panels, which provide greater nesting efficiency than previously achieved by comparable airbags using round panels. In addition, the construction enables the airbag to take full advantage of the strength of the yarns forming the fabric, and the energy absorption of the fabric construction, enabling the use of lower tenacity yarns and/or materials at comparable levels of performance.

4 Claims, 10 Drawing Sheets

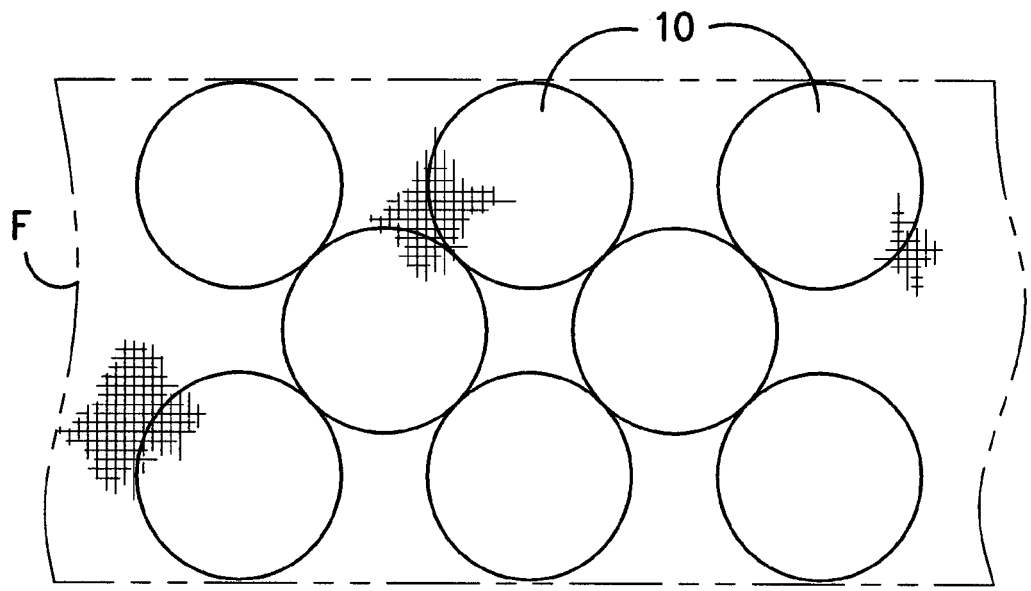
FIG. -1-
PRIOR ART
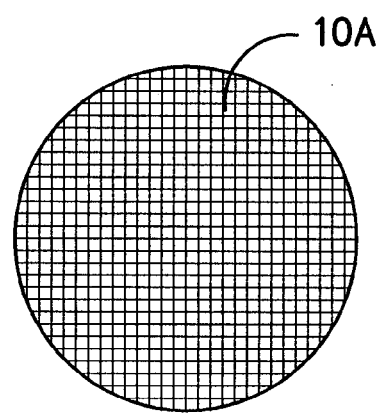 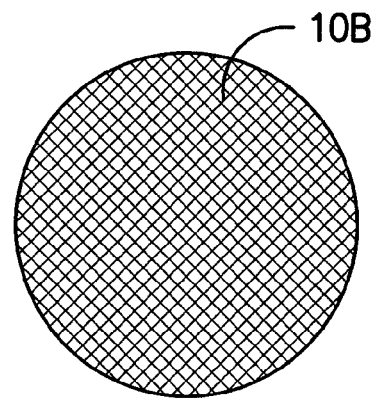
FIG. -2A-  FIG. -2B-
PRIOR ART  PRIOR ART

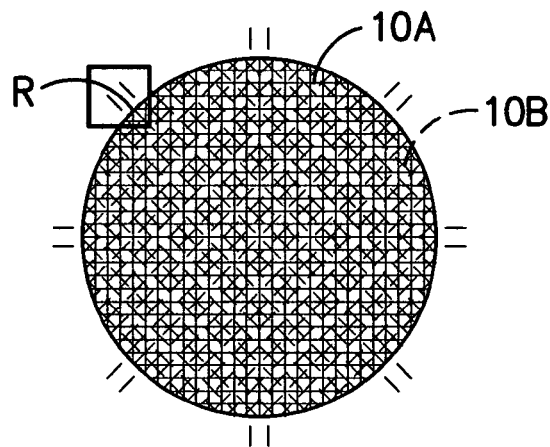
FIG. -3-
PRIOR ART
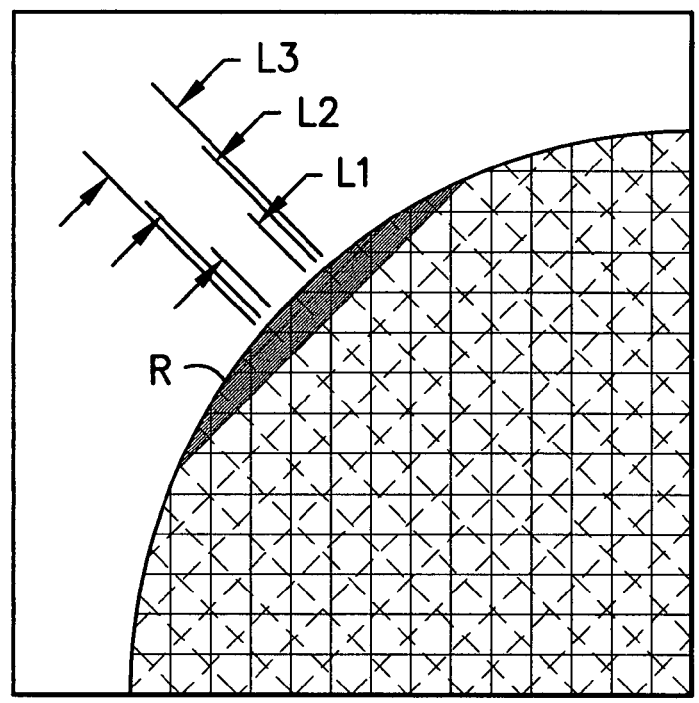
FIG. -4-
PRIOR ART

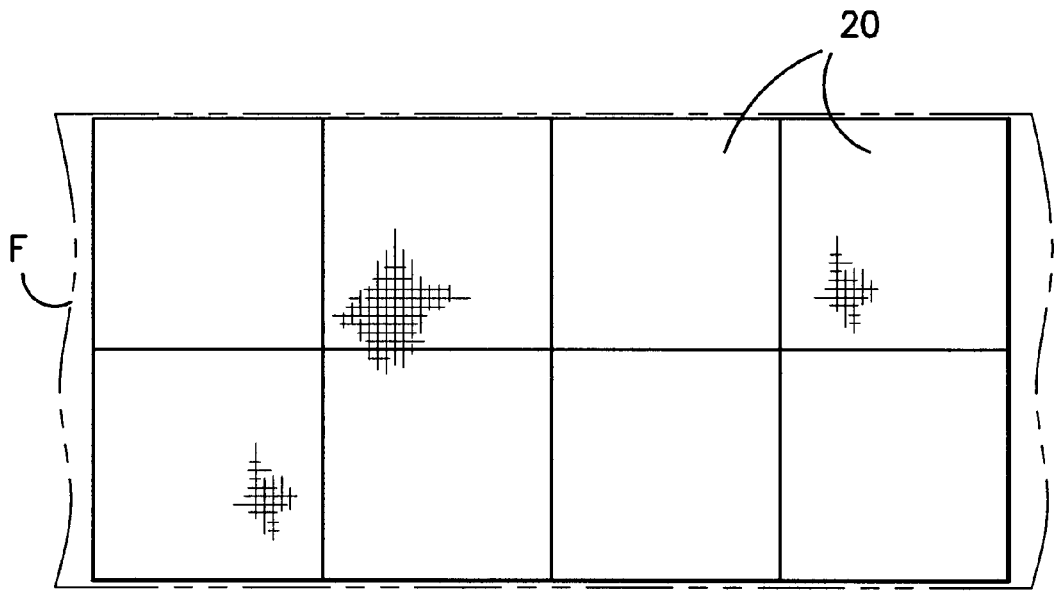
FIG. −5−
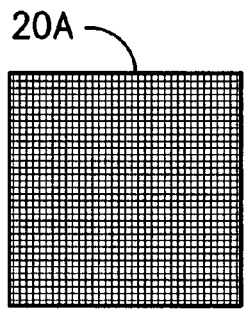
FIG. −6A−
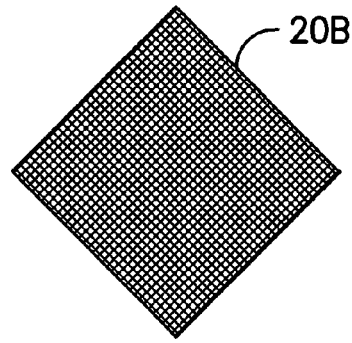
FIG. −6B−
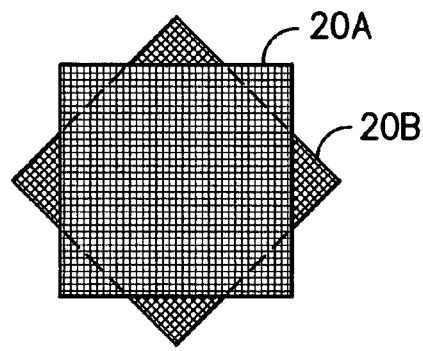
FIG. −6C−
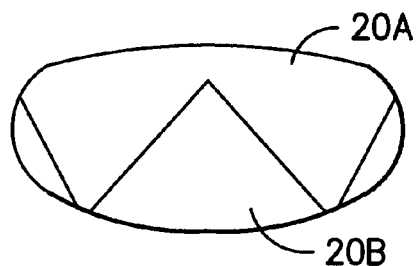
FIG. −7−

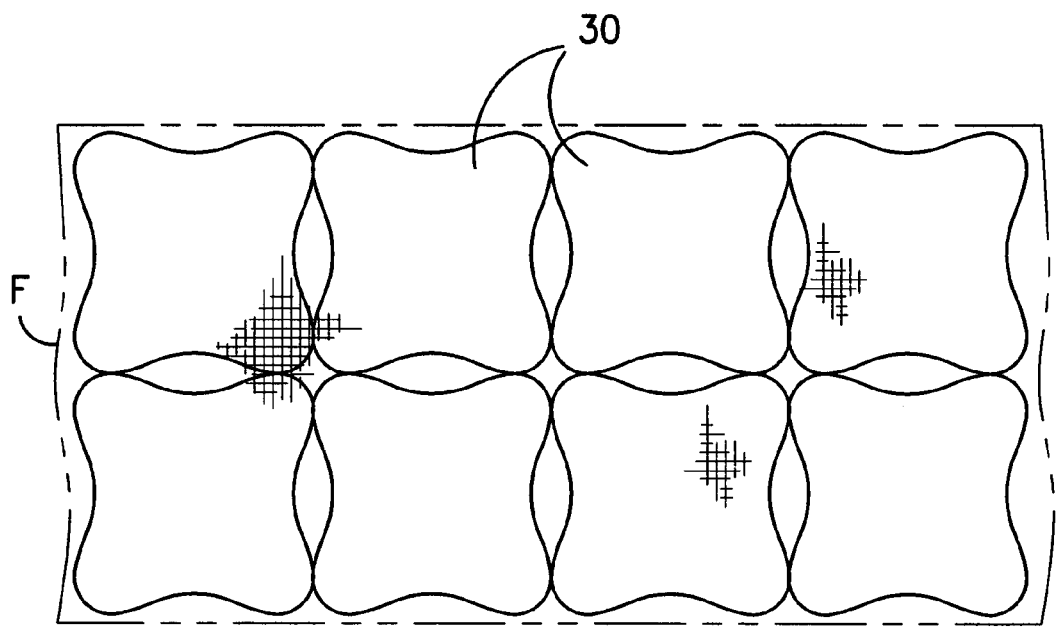
FIG. -8-
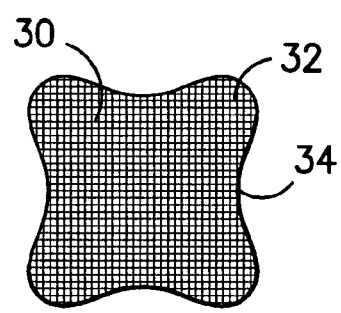
FIG. -9-

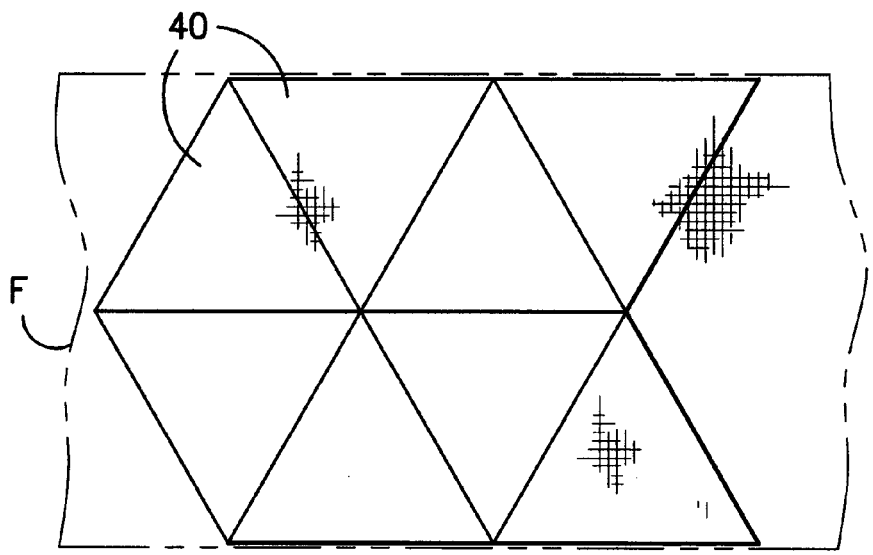
FIG. -10-
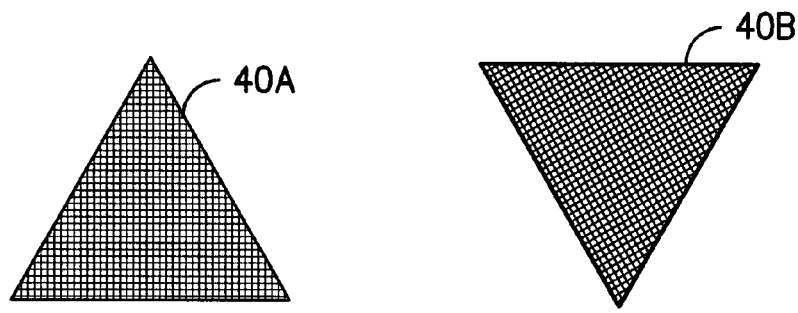
FIG. -11A-   FIG. -11C-
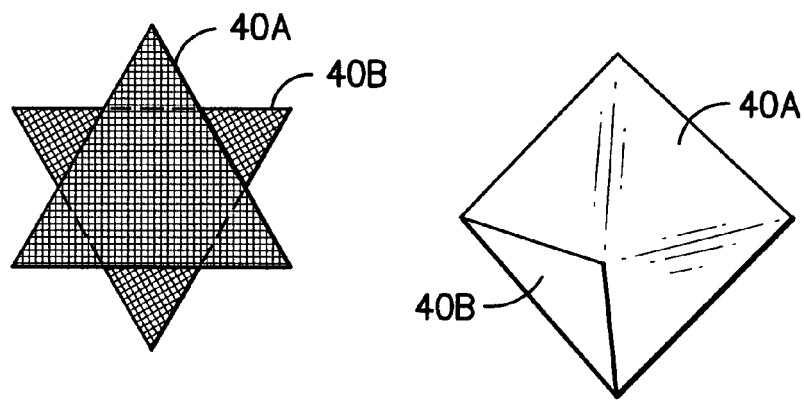
FIG. -11B-   FIG. -12-

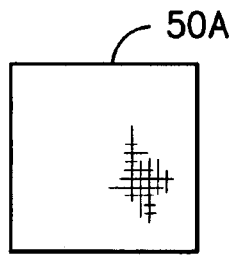
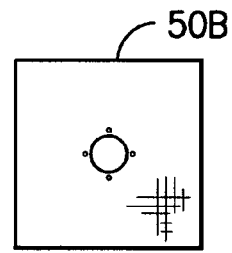
FIG. -13A-       FIG. -13B-
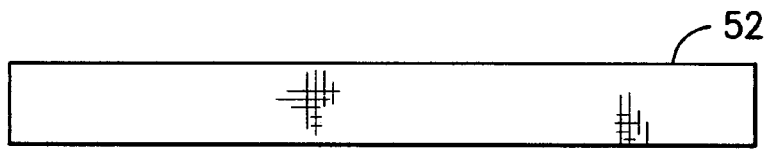
FIG. -13C-
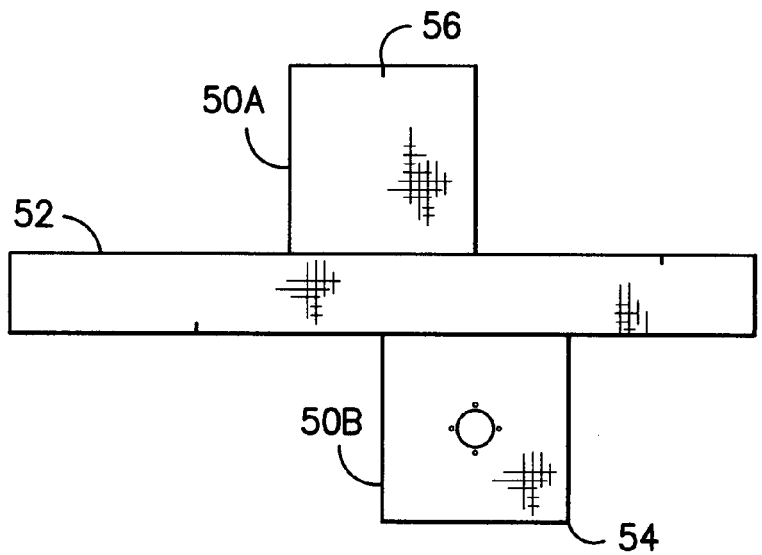
FIG. -14-
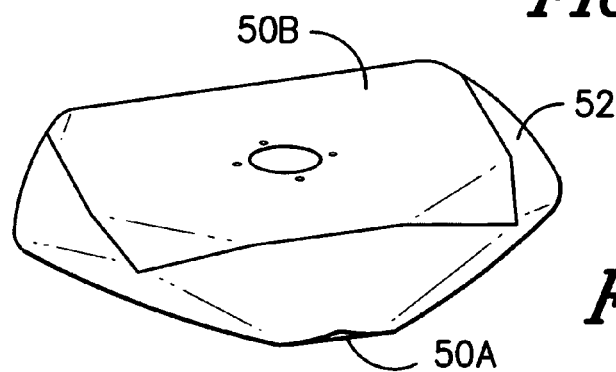
FIG. -15-

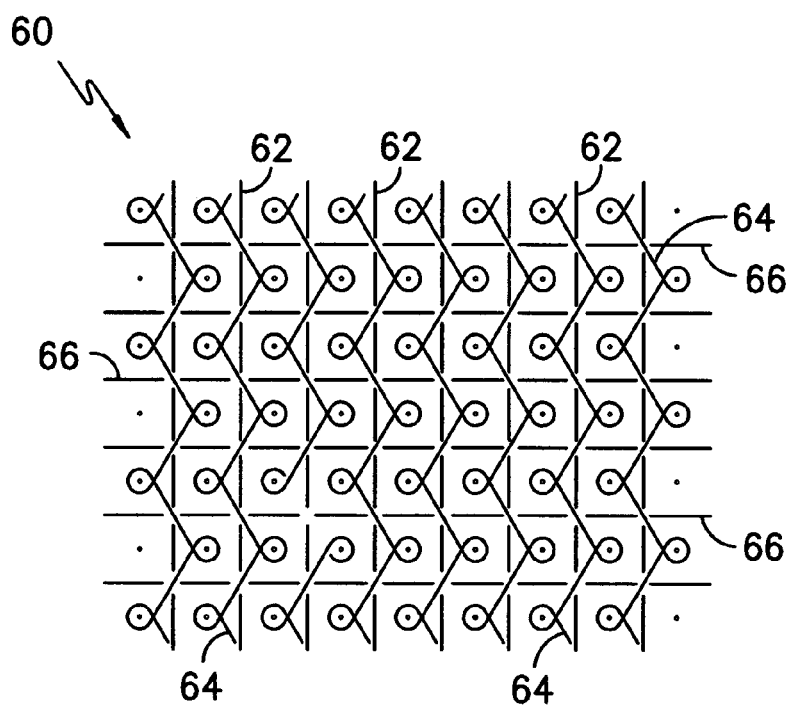
FIG. -16-
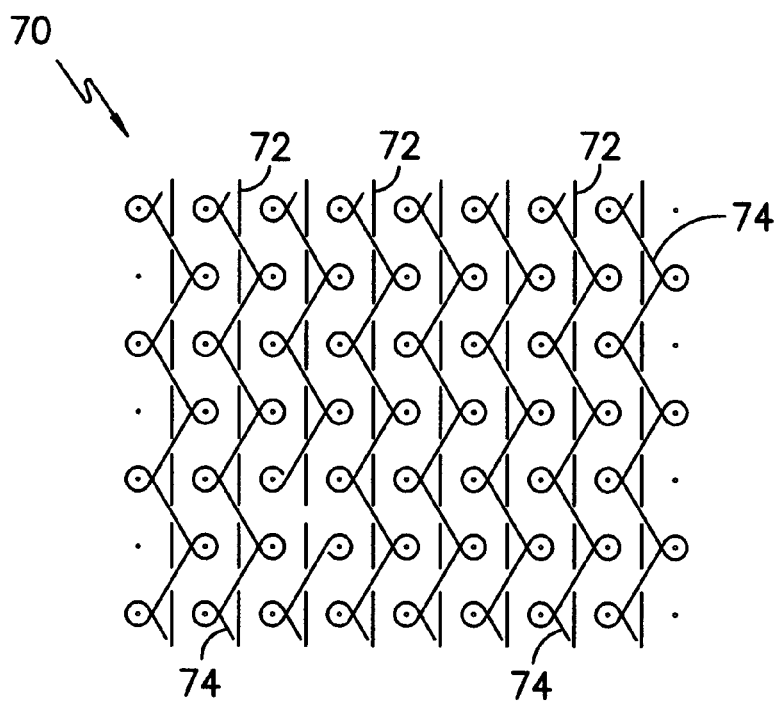
FIG. -17-

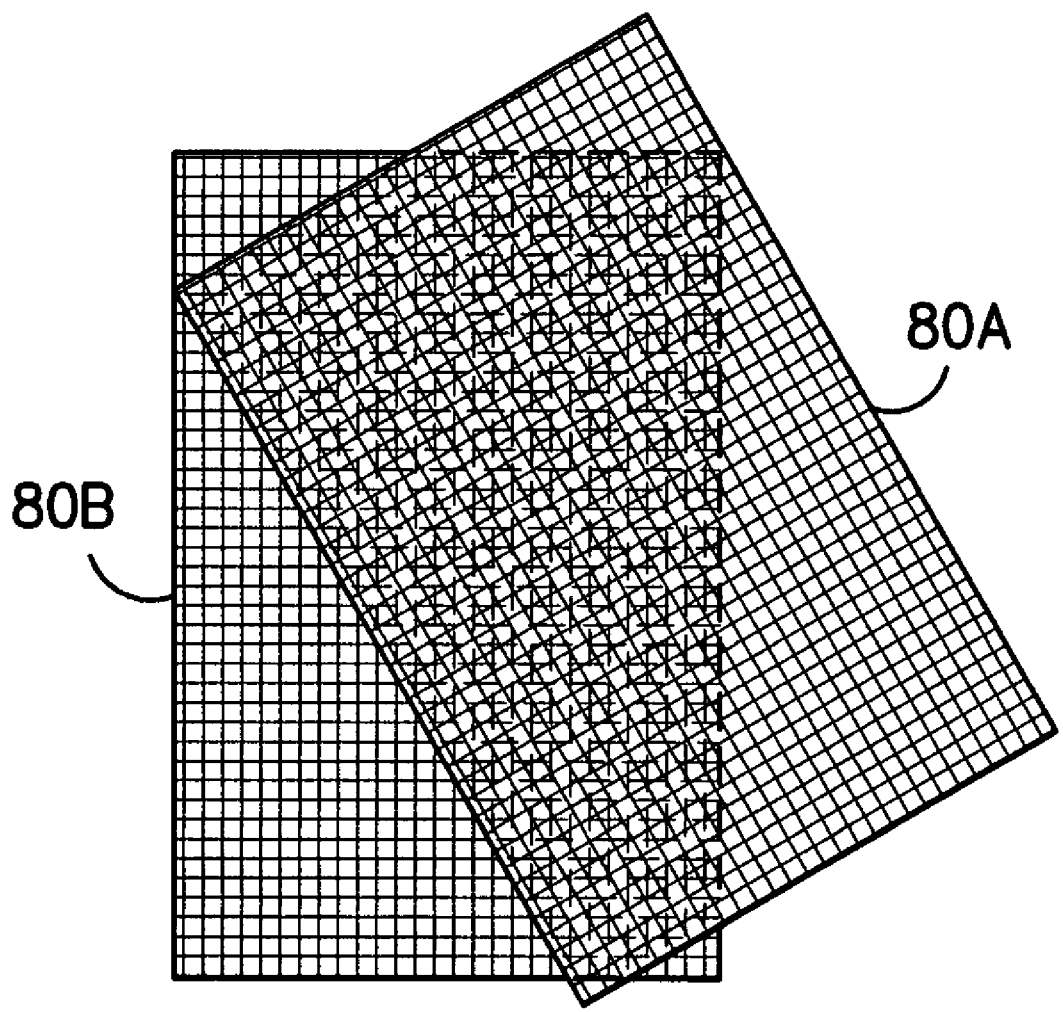
FIG. -18-

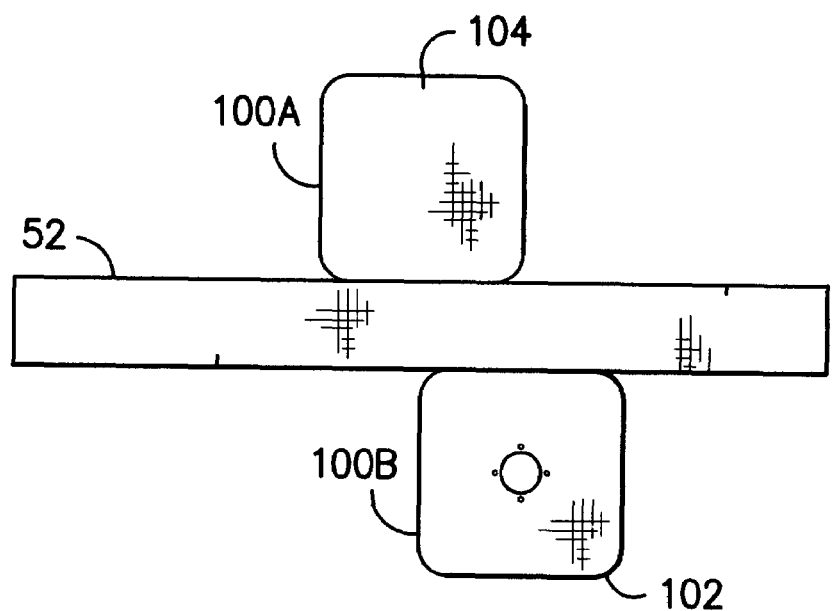
FIG. -19-
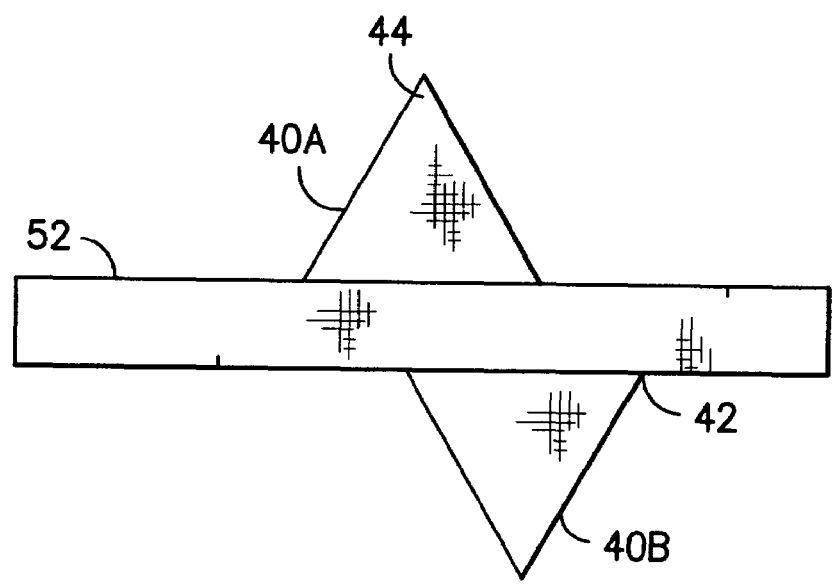
FIG. -20-

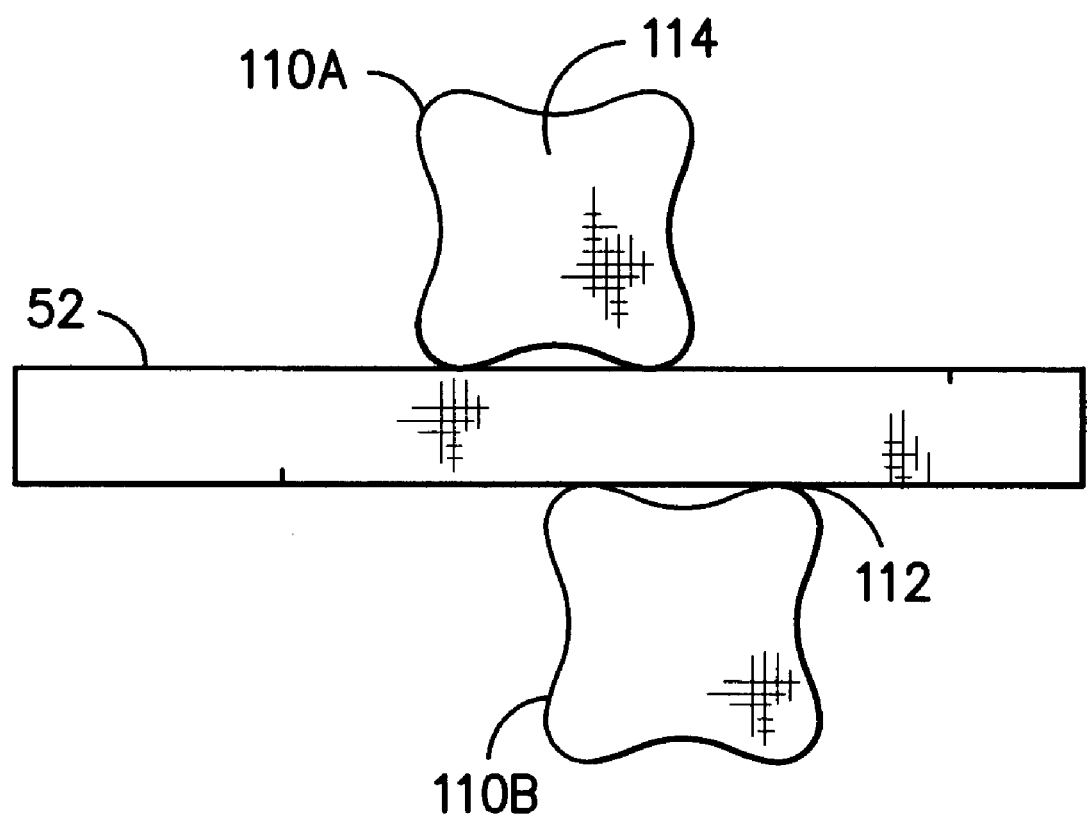
FIG. -21-

AIRBAG STRUCTURE

BACKGROUND OF THE INVENTION

Driver side airbags are typically made from circular shaped panels so that when inflated, the airbag is symmetrical to provide thorough protection for the occupant in case of vehicular accident. The airbags also typically include internal tethers to control the excursion of the leading edge panel and help to provide the desired depth when inflated. The circular shaped front and back panels do not nest well on a given width of fabric and as a result, the nesting efficiency is not very good. For example, typical driver airbag nesting efficiency ranges between 80 and 85%, even though the rest of the bag components (such as the tethers and reinforcements) are nested in the space created between the circular pieces.

The inventor hereof has previously proposed polygonal shaped bag panels (front and rear) having more than five sides, in order to improve the efficiency of the nest. However, as will be appreciated by those of ordinary skill in the art, panels with about five sides or greater end up approximating the shape of a circle, and therefore have some of the drawbacks of the circular bags.

SUMMARY

The present invention provides an airbag construction having front and rear panels, with each of those panels being generally non-circular (i.e. having a shape not approximating a circle), with the front and rear panels being oriented in the airbag such that at least one yarn in the front panel is at a bias to at least one yarn in the rear panel. In many embodiments of the invention, the panels will contain lengthwise and crosswise yarns, and the lengthwise and crosswise yarns in the respective panels are arranged at a bias to each other. Preferably, the panels will be polygon-shaped and will have three to four sides. The construction of this invention enables greater nesting efficiency than previously achieved by comparable airbags using round panels. In addition, the construction enables the airbag to take full advantage of the strength of the yarns forming the fabric, and the energy absorption of the fabric, enabling the use of lower tenacity yarns at comparable levels of performance.

While many embodiments herein are described specifically in connection with woven fabrics (where the lengthwise and crosswise extending yarns correspond to the warp and filling yarns, respectively), it is noted that bags made according to the invention can also be made from other materials, including but not limited to warp or weft laid fabrics, weft inserted warp knit fabrics, weft inserted fabrics, needlepunched fabrics, or the like, provided such fabrics have directionality in the lengthwise (e.g. warp) and crosswise (e.g. filling) directions. Therefore, where reference herein is made to the warp and filling directions, it is to be understood that those are likewise intended to encompass the corresponding lengthwise and crosswise extending yarns of other forms of fabric constructions described herein.

BRIEF DESCRIPTION OF THE DRAWINGS

FIG. 1 illustrates a conventional nesting arrangement of prior art circular airbag panels;

FIGS. 2A and 2B show two panels of the variety cut in FIG. 1, as the generally perpendicular yarns sets are oriented as they are overlaid in FIG. 3;

FIG. 3 is a plan view of the panels of FIGS. 2A and 2B overlying each other for seaming;

FIG. 4 is an enlargement of the area of FIG. 3;

FIG. 5 illustrates a nesting arrangement of square shaped panels that can be used in the instant invention;

FIGS. 6A and 6B illustrate front and rear panels of the invention, and FIG. 6C illustrates these panels being oriented for securement together;

FIG. 7 illustrates a bag formed from the panels illustrated in FIGS. 6A, 6B and 6C;

FIG. 8 is a nesting arrangement of an alternative embodiment of the invention;

FIG. 9 is a plan view of a panel cut from the nesting arrangement illustrated in FIG. 8;

FIG. 10 is a nesting arrangement of a further alternative embodiment of the invention;

FIGS. 11A and 11B illustrate front and rear panels of the invention, and FIG. 11C illustrates these panels being oriented for securement together;

FIG. 12 is a perspective view of a bag made utilizing the panels shown in FIGS. 11A, 11B, and 11C;

FIGS. 13A, 13B, and 13C illustrate panels for forming another embodiment of the invention;

FIG. 14 illustrates how the panels of FIGS. 13A, 13B and 13C are oriented relative to each other for seaming;

FIG. 15 illustrates a bag made from the panels shown in FIGS. 13A, 13B, 13C, and 14;

FIG. 16 illustrates a weft inserted warp knit fabric of the variety that may be utilized to form bags according to the invention;

FIG. 17 illustrates an alternate fabric that may be utilized to form bags according to the invention; and FIG. 18 illustrates an alternate embodiment of panels that may be used to form the bags of the invention.

FIG. 19 illustrates how four-sided panels with rounded corners are oriented relative to each other for seaming with an additional fabric panel;

FIG. 20 illustrates how triangular-sided panels are oriented relative to each other for seaming with an additional fabric panel;

FIG. 21 illustrates how four-sided panels with rounded corners and concave portions are oriented relative to each other for seaming with an additional fabric panel.

DETAILED DESCRIPTION

In the following detailed description of the invention, specific preferred embodiments of the invention are described to enable a full and complete understanding of the invention. It will be recognized that it is not intended to limit the invention to the particular preferred embodiment described, and although specific terms are employed in describing the invention, such terms are used in a descriptive sense for the purpose of illustration and not for the purpose of limitation.

With reference to the drawings, FIG. 1 is an illustration of a nesting arrangement for round panels 10 used to make prior art round airbag constructions, illustrating how they would be cut from a piece of fabric F. As illustrated, this construction only enables about an 85% or less nesting efficiency (defined as the square yards of fabric forming the panels divided by the total square yards of fabric required for those panels to be provided.)

FIGS. 2A and 2B illustrate cut panels used to form the conventional round airbags. As illustrated, two circular panels 10A, 10B are cut (defining front and rear panels), and in this case, they are rotated 45 degrees relative to each other so that fabric elongation can be optimized. (As will be appreciated by those of ordinary skill in the art, woven fabrics have the greatest elongation in a bias direction, rather than in the direction of the warp and filling yarns.) Although illustrated as being rotated 45°, it is noted that other bias angles could be used within the scope of the invention. Preferably, the angle will range from about 27° to about 65°. However, as shown in FIGS. 3 and 4, when the panels are seamed together, at eight evenly-spaced regions R on the periphery of the circle, only a yarn or two of one of the fabric layers is caught within the seam. As shown at the lengths L1, L2, and L3, only minor portions of the panel 10B are caught within the seam. As a result, the strength of the airbag at those eight points R is compromised, such that those points define weak spots susceptible to heat erosion and seam combing. Because of the round shape of the prior airbags, it has previously been impossible to avoid these weak spots.

FIG. 5 illustrates a nesting arrangement for square-shaped panels 20 that can be used in one embodiment of the invention. As shown, a nesting efficiency approximating 100% can be achieved, since the straight sides of the squares can fit directly next to each other. As will be appreciated by those of ordinary skill in the art, where the width of the fabric used is a multiple of the widthwise dimension of the squares, then substantially 100% of the fabric can be utilized. Also for purposes of this application, where the fabric used is of a width greater than a multiple of the width of the square panels, it would still be considered to achieve 100% nesting efficiency, since the surplus fabric would be a result of the fabric width rather than an inefficient nesting of the panels.

As illustrated in FIGS. 6A, 6B and 6C, in this embodiment, first and second square panels 20A, 20B are cut from a woven fabric such that the warp and filling yarns run, generally parallel to the panel edges. These panels define the front and rear panels of the airbag. One of the panels is turned at an angle relative to the other (as shown in FIG. 6C), such that the yarns in the front panel are at a bias to the yarns in the rear panel. In this embodiment, the peripheries of the two panels are seamed together. As illustrated, this results in a three dimensional structure having a seam that zig-zags around the periphery, as shown in FIG. 7. While shown as being at a 45 degree angle relative to each other, it is noted that other bias angles can be used within the scope of the invention. Also, although the four-sided panel illustrated is square-shaped, it is to be noted that other four-sided shapes such as rectangles can be used within the scope of the invention.

FIG. 9 illustrates an alternative embodiment of the invention, which can be made utilizing generally square-shaped panels having rounded corners 32 such as those shown at 30. As shown, the panels 30 of this embodiment can also have concave side portions 34 if desired. It has been found that this modified square shape facilitates sewing of the panels together, since no sharp corners must be seamed. A nesting arrangement for panels made according to this embodiment is shown in FIG. 8.

FIG. 10 shows a further alternative nesting arrangement for a plurality of triangular shaped panels 40A, 40B. FIGS. 11A and 11B show the triangular panels 40A, 40B after they are removed from the fabric F, with FIG. 11C showing how the panels are oriented relative to each other prior to seaming the panels together. As illustrated, the warp or filling yarns will run parallel to one triangle edge, and the panels are positioned relative to each other such that the yarns are positioned at a bias relative to each other. In other words, if the two triangular panels were initially positioned over each other such that the warp and filling yarns of each of the panels ran in the same direction, then one of the panels would be rotated at an angle relative to the other, such that the outline of the panels generally forms a six-pointed star shape, with the yarns of one panel being at a bias to the other. The point of one panel is then joined to the center of a straight side of the other panel, and the peripheries of the panels are seamed together. Although illustrated as having sharp corners, it is noted that this embodiment can also have rounded corners and/or concave sides like the rounded embodiment of the square panel design. In addition, although it is illustrated as being an equilateral triangle, other three-sided shapes may be utilized within the scope of the invention.

FIG. 12 illustrates the airbag made using the panels 40A and 40B shown in FIGS. 11A, 11B and 11C. As shown, the structure is in three-dimensional form as-seamed (i.e. prior to inflation.)

FIGS. 13A, 13B and 13C show panels that can be used to make a further alternative embodiment of the invention. This embodiment is similar to that shown in FIGS. 6 and 7, yet it includes an intermediate strip-like panel between the front and rear panels, which enables a bag having a comparable inflated volume to be achieved from smaller front and rear panels. As a result, greater nesting efficiency may be achieved. In this embodiment, first and second four-sided panels 50A and 50B are cut as described above with respect to FIG. 6. However, in this embodiment, an additional fabric panel 52 is provided intermediate the front and rear panels. The front and rear panels 50A, 50B are positioned such that the yarns in one are at a bias relative to the yarns in the other, but rather than the panels being joined directly together, the peripheral side panel 52 is seamed between the two. In this way, additional three dimensionality can be readily provided. This can be accomplished by offsetting the front and rear panel-forming pieces in the manner shown in the figure, and seaming corner 54 of panel 50B to a central region 56 of panel 50A, then seaming around the entire periphery in the manner performed with respect to FIGS. 6 and 7, thereby securing panel 52 between the front and rear panels along the seam. The resulting bag is illustrated in FIG. 15. Although illustrated as being three separate pieces, it is noted that the pieces could be cut such that the adjacent edges are left attached rather than fully cut into separate pieces. In addition, although shown in combination with the square shaped panels, it is noted that this side banding can be provided in combination with any of the embodiments of the invention.

This side banding with various shaped panels, as described above, can be seen for example in FIGS. 19, 20 and 21. FIG. 19 shows four-sided panels with rounded corners 100A and 100B with a peripheral side panel 52 provided intermediate the front and rear panels. The front and rear panels 100A, 100B are positioned such that the yarns in one are at a bias relative to the yarns in the other, but rather than the panels being joined directly together, the peripheral side panel 52 is seamed between the two. In this way, additional three dimensionality can be readily provided. This can be accomplished by offsetting the front and rear panel-forming pieces in the manner shown in the figure, and seaming corner 102 of panel 100B to a central region 104 of panel 100A, then seaming around the entire periphery in the manner performed with respect to FIGS. 6 and 7.

FIG. 20 shows triangular shaped panels 40A, 40B with a peripheral side panel 52 provided intermediate the front and rear panels. The front and rear panels 40A, 40B are positioned such that the yarns in one are at a bias relative to the yarns in the other, but rather than the panels being joined directly together, the peripheral side panel 52 is seamed between the two. In this way, additional three dimensionality can be readily provided. This can be accomplished by offsetting the front and rear panel-forming pieces in the manner shown in the figure, and seaming corner 42 of panel 40B to a central region 44 of panel 40A, then seaming around the entire periphery in the manner performed with respect to FIGS. 6 and 7.

FIG. 21 shows generally square-shaped panels having rounded corners and concave portions 110A, 110B with a peripheral side panel 52 provided intermediate the front and rear panels. The front and rear panels 110A, 110B are positioned such that the yarns in one are at a bias relative to the yarns in the other, but rather than the panels being joined directly together, the peripheral side panel 52 is seamed between the two. In this way, additional three dimensionality can be readily provided. This can be accomplished by offsetting the front and rear panel-forming pieces in the manner shown in the figure, and seaming corner 112 of panel 110B to a central region 114 of panel 110A, then seaming around the entire periphery in the manner performed with respect to FIGS. 6 and 7.

As noted previously, the present invention enables the use of fabrics having lower tensile strengths than previously required for the same strength of airbag. FIG. 16 illustrates a weft inserted warp knit fabric 60 that can be used to form bags according to the invention. As illustrated, the fabric includes generally lengthwise extending yarns 62 and 64, and cross-wise extending yarns 66 which extend generally perpendicular to the longitudinally extending yarns 62 and 64. When fabrics such as this are utilized to form airbags according to the invention, the yarns 62, 64, and 66 in the front panel will be oriented at a bias relative to the yarns of the rear panel.

FIG. 17 illustrates an alternative fabric construction that may be used to form airbag cushions according to the invention. This fabric 70 has lengthwise extending warp yarns 72 as well as generally lengthwise extending yarns 74.

FIG. 18 illustrates a further alternative embodiment of the invention. In this embodiment, generally rectangular shaped panels 80A and 80B are utilized to create a generally rectangular shaped airbag. These panels will be joined together in the manner described above with respect to the square and triangular shaped bags.

While particularly described in connection with driver side airbags, it is noted that the bag constructions of the invention can be used in any airbag. The construction described provides a number of advantages over the constructions of prior airbags. For example, the weak spots inherent in the prior circular airbags are avoided. In addition, because the bags are formed with a three-dimensional shape (as opposed to the two dimensional shape of the circular airbags prior to inflation), bags can be made to have equivalent volumes using smaller dimensions of fabric. For example, a conventional 54 liter circular airbag will generally require panels that are 28 inches in diameter, to accommodate the loss in diameter that occurs when the bag is inflated. By comparison, a similar 54 liter airbag made according to the instant invention could be made using square panels that are 24 inches in length and width. Furthermore, the bags of the invention have been shown to have higher burst strength, both when tethered and untethered (as illustrated below.) Because the bags made according to the invention surpass the burst strengths achieved by the round airbags made from the same fabrics, it therefore follows that the constructions of the present invention will enable the use of fabrics of lower tenacity than previously required for the circular constructions (e.g. enabling the use of lower tenacity yarns, less costly fabric constructions, less highly constructed fabrics, or combinations thereof.)

The constructions of the invention can be made of any fabric or material that provides the requisite properties, and can be coated, laminated, or the like if so desired. For example, airbags commonly are made from nylon 6-6. Other yarns and fibers include but are not limited to polyester fibers, nylon 6 fibers, other synthetic fibers, natural fibers or blend thereof, spun yarns, mono-filament yarns, multifilament yarns, etc. at any desired denier. The fabrics and bags can also include coatings and/or films including but not limited to polyurethanes, polyetherurethanes, polypropylenes, polyesterurethanes, polypropylenes, polyamides, ethylenevinylacetates, polyesters, etc.

The method of the invention involves providing first and second fabric panels having a non-circular geometrical configuration, wherein said panels comprise generally perpendicularly intersecting lengthwise and cross-wise extending yarns. The panels are then secured together (either directly or via a side banding piece) such that the yarns in the front panel are at a bias to the yarns in the rear panel. The seaming can be performed in any conventional manner, but desirably is performed by sewing. However, other methods such as welding, adhesive attachment, ultrasonic sealing, etc., and combinations thereof, can be utilized within the scope of the invention.

EXAMPLES

Airbag Burst Test

Airbags were manufactured as described below. All were made from a fabric of the variety used in conventional airbags (plain woven uncoated fabric having 41 ends per inch and 41 picks per inch, woven from 630 denier nylon 6-6 yarns.) The bags with tethers had an 11 inch long tether made from the same type of fabric as the bag panels, attached in a conventional manner. The bags with tethers were checked for the inflated volume and were found to be 54±2 liters at 1 Psi internal bag pressure. The bag burst test procedure was a modified version of the ISO bag burst pressure procedure, described in a publication entitled "Bag Burst Test Procedure" published by Autoliv on Aug. 10, 1994, test serial no. SO44, which is readily available and known by those of ordinary skill in the art. A test tank was pressurized to 125 Psi and an orifice plate with one 4-inch hole was used to mimic the gas flow rate from the inflator. Vents in the bags were plugged for testing with the same material as the bag. Plugs were sewn on the inside of the back panel to ensure that the vent hole was completely covered and sewn shut. The maximum pressure in the bag was recorded within 120 milliseconds of firing the inflation tank. Typical driver airbags of volume less than 62 liters would be burst under these conditions.

Ten cushions of each type were tested, and the scores were averaged. The results are listed in the table below.

|  | Burst Pressure (psi) | Bag Burst at Max. Pressure |
| --- | --- | --- |
| 28 inch round bag without tether | 20.025 | yes |
| 28 inch round bag with tether | 27.8 | yes |

-continued

| | Burst Pressure (psi) | Bag Burst at Max. Pressure |
|---|---|---|
| 24 inch square without tether | 25.12 | yes |
| 24 square with tether | 30.15 | no (tether failure only) |

In the specification there has been set forth a preferred embodiment of the invention, and although specific terms are employed, they are used in a generic and descriptive sense only and not for purpose of limitation, the scope of the invention being defined in the claims.

I claim:

1. An airbag cushion comprising in part a front panel and a rear panel, wherein each of said front and rear panels has a substantially rectangular or square configuration, wherein each of said panels comprises generally perpendicularly arranged sets of yarns, wherein the yarns in the front panel are at a bias to the yarns in the rear panel, and further comprising a peripheral side panel connected to and extending between peripheries of said front and rear panels, further wherein said front and rear panels have concave sides.

2. An airbag cushion comprising a front panel and a rear panel, wherein each of said panels has a polygonal configuration with a maximum of four sides, wherein each of said panels is formed of at least two generally perpendicularly arranged sets of yarns, and wherein the yarns in the front panel are at a bias to the yarns in the rear panel, and further comprising a peripheral side panel extending between the front panel and rear panel, further wherein said front and rear panels have concave sides.

3. An airbag cushion comprising a front panel and a rear panel, wherein each of said front and rear panels has a geometrical configuration approximating a triangle, wherein said panels comprise generally perpendicularly intersecting warp and filling yarns, and wherein the yarns in the front panel are at a bias to the yarns in the rear panel, further comprising a peripheral side panel connected to and extending between the peripheries of the front and rear panels.

4. An airbag cushion comprising a front panel and a rear panel, wherein said front and rear panels comprise a geometrical configuration approximating a square, a rectangle, or a triangle, wherein said panels comprise generally perpendicularly intersecting warp and filling yarns, and wherein the yarns in the front panel are at a bias to the yarns in the rear panel, further comprising a peripheral side panel connected to and extending between the peripheries of the front and rear panels, wherein said front and rear panels define rounded corners and generally concave sides.

* * * * *